United States Patent
McClelland et al.

(10) Patent No.: US 8,705,117 B1
(45) Date of Patent: Apr. 22, 2014

(54) HAND-HELD PRINTING DEVICE AND METHOD FOR TUNING INK JET COLOR FOR PRINTING ON COLORED PAPER

(75) Inventors: Todd A. McClelland, Corvallis, OR (US); Asher Simmons, Corvallis, OR (US)

(73) Assignee: Marvell International Ltd. (BM)

(*) Notice: Subject to any disclaimer, the term of this patent is extended or adjusted under 35 U.S.C. 154(b) by 1439 days.

(21) Appl. No.: 12/141,717

(22) Filed: Jun. 18, 2008

Related U.S. Application Data (60) Provisional application No. 60/944,656, filed on Jun. 18, 2007.

(51) Int. Cl.
*H04N 1/60* (2006.01)
*G06K 1/00* (2006.01)

(52) U.S. Cl.
USPC ............ 358/1.9; 358/515; 358/518; 358/514; 358/3.1; 382/254; 347/43; 347/16; 347/101; 347/105; 400/62

(58) Field of Classification Search
USPC ............................. 358/1.9, 515, 518; 382/254
See application file for complete search history.

(56) References Cited

U.S. PATENT DOCUMENTS

| | | | |
|---|---|---|---|
| 3,469,422 A | 9/1969 | Minton | |
| 4,387,579 A | 6/1983 | Branke et al. | |
| 4,714,936 A | 12/1987 | Helinski et al. | |
| 5,351,069 A * | 9/1994 | Koike et al. | 347/215 |
| 5,578,813 A | 11/1996 | Allen et al. | |
| 5,593,236 A | 1/1997 | Bobry | |
| 5,825,995 A | 10/1998 | Wiklof et al. | |
| 5,861,877 A | 1/1999 | Kagayama et al. | |
| 5,927,872 A | 7/1999 | Yamada | |
| 6,000,946 A | 12/1999 | Snyders et al. | |
| 6,030,582 A | 2/2000 | Levy | |
| 6,217,017 B1 | 4/2001 | Yamazaki | |
| 6,229,565 B1 * | 5/2001 | Bobry | 348/207.99 |
| 6,312,124 B1 | 11/2001 | Desormeaux | |
| 6,332,677 B1 | 12/2001 | Steinfeld et al. | |
| 6,357,939 B1 | 3/2002 | Baron | |

(Continued)

FOREIGN PATENT DOCUMENTS

| | | |
|---|---|---|
| EP | 1 543 981 A3 | 7/2006 |
| EP | 1 543981 A3 | 7/2006 |

(Continued)

OTHER PUBLICATIONS

GB Search Report for GB Application No. 0610837.7, dated Oct. 31, 2006, 2 pages.

(Continued)

*Primary Examiner* — Quang N Vo (57) ABSTRACT

A hand-held printer is disclosed. The hand-held printer includes an image sensor configured to determine a color having plurality of color components associated with a print medium, an image processing module configured to process image data into a plurality of color layers; and a print module configured to receive information related to the plurality of color components from the image sensor and information related to the plurality of color layers from the image processing module. The print module being configured to enhance at least one of the plurality of color layers based on at least one of the corresponding plurality of color components associated with the print medium.

19 Claims, 10 Drawing Sheets

(56) References Cited

U.S. PATENT DOCUMENTS

| | | |
|---|---|---|
| 6,390,249 B2 | 5/2002 | Tachibana |
| 6,467,870 B2 | 10/2002 | Matsumoto et al. |
| 6,517,266 B2 | 2/2003 | Saund |
| 6,580,244 B2 | 6/2003 | Tanaka et al. |
| 6,682,190 B2 | 1/2004 | Rasmussen et al. |
| 6,773,177 B2 | 8/2004 | Denoue et al. |
| 6,789,869 B2 | 9/2004 | Takeishi |
| 6,833,852 B1 * | 12/2004 | Maess et al. ............... 347/188 |
| 6,851,878 B2 | 2/2005 | Hemmerlin |
| 6,896,349 B2 | 5/2005 | Valero et al. |
| 6,933,889 B1 | 8/2005 | Wolf et al. |
| 6,942,335 B2 | 9/2005 | Trent |
| 6,951,778 B2 | 10/2005 | Akhavain et al. |
| 6,952,284 B2 | 10/2005 | Andrews et al. |
| 7,013,029 B2 | 3/2006 | Keskar et al. |
| 7,108,370 B2 | 9/2006 | Breton |
| 7,184,167 B1 | 2/2007 | Ito et al. |
| 7,336,388 B2 | 2/2008 | Breton |
| 7,627,189 B2 * | 12/2009 | Donomae et al. ........... 382/254 |
| 7,679,604 B2 | 3/2010 | Uhlik et al. |
| 7,808,450 B2 | 10/2010 | Wanda et al. |
| 7,812,994 B2 | 10/2010 | Carlson et al. |
| 2003/0043388 A1 | 3/2003 | Andrews et al. |
| 2003/0152679 A1 | 8/2003 | Garwood |
| 2004/0252051 A1 | 12/2004 | Johnson |
| 2005/0068553 A1 * | 3/2005 | Otake et al. ................ 358/1.9 |
| 2006/0050131 A1 | 3/2006 | Breton |
| 2006/0279784 A1 | 12/2006 | Carlson et al. |
| 2007/0009277 A1 | 1/2007 | Shoen |
| 2007/0080494 A1 | 4/2007 | Marshall et al. |
| 2007/0153046 A1 * | 7/2007 | Kanematsu et al. ........... 347/19 |
| 2007/0171245 A1 * | 7/2007 | Ueda et al. .................. 347/14 |
| 2008/0123126 A1 | 5/2008 | Harris |
| 2008/0144053 A1 | 6/2008 | Gudan et al. |
| 2008/0204770 A1 | 8/2008 | Bledsoe et al. |
| 2008/0211848 A1 | 9/2008 | Mealy et al. |
| 2008/0211864 A1 | 9/2008 | Mealy et al. |
| 2008/0212118 A1 | 9/2008 | Mealy et al. |
| 2008/0212120 A1 | 9/2008 | Mealy et al. |
| 2008/0213018 A1 * | 9/2008 | Mealy et al. ................... 400/62 |
| 2008/0215286 A1 | 9/2008 | Mealy et al. |
| 2008/0262719 A1 | 10/2008 | Bledsoe et al. |

FOREIGN PATENT DOCUMENTS

| | | |
|---|---|---|
| WO | WO 03/055689 A1 | 7/2003 |
| WO | WO 03/076196 A1 | 9/2003 |
| WO | WO 03/076197 | 9/2003 |
| WO | WO 2004/056577 A1 | 7/2004 |
| WO | WO 2004/088576 | 10/2004 |
| WO | WO 2005/070684 A1 | 8/2005 |

OTHER PUBLICATIONS

HP Ink Jet Printer Cartridge Anatomy, http://wandel.ca.hp45_anatomy/index.html, printed Apr. 19, 2007, pp. 1-8.

International Search Report mailed Jul. 28, 2008, for International Application No. PCT/US2008/55636.

U.S. Appl. No. 11/952,849 entitled, "Handheld Tattoo Printer", filed Dec. 7, 2007, 43 pages.

U.S. Appl. No. 12/036,862, entitled, "Print Head Configuration for Hand-Held Printing", filed Feb. 25, 2008, 32 pages.

U.S. Appl. No. 12/039,491 entitled, "Cap Design for an Inkjet Print Head With Hand-Held Imaging Element Arrangement With Integrated Cleaning Mechanism", filed Feb. 28, 2008. 38 pages.

U.S. Appl. No. 12/041,466 entitled, "Ink Supply for a Hand-Held Ink Jet Printer", filed Mar. 3, 2008, 38 pages.

U.S. Appl. No. 12/074,018 entitled, "Hand-Propelled Labeling Printer", filed Feb. 28, 2008, 47 pages.

U.S. Appl. No. 12/074,123, entitled, "Managing Project Information with a Hand-Propelled Device", filed Feb. 28, 2008, 50 pages.

U.S. Appl. No. 12/132,405 entitled, Device and Method for Dispensing White Ink, filed Jun. 3, 2008, 37 pages.

Written Opinion of the International Searching Authority mailed on Jul. 28, 2008, for International Application No. PCT/US2008/55636.

* cited by examiner

HAND-HELD PRINTING DEVICE AND METHOD FOR TUNING INK JET COLOR FOR PRINTING ON COLORED PAPER

CROSS-REFERENCE TO RELATED APPLICATIONS

This patent claims the priority benefit under 35 U.S.C. §119(e) of U.S. provisional patent application Ser. No. 60/944,656 (MP1915PR), filed on Jun. 18, 2007, the content of which is hereby incorporated by reference for all purposes.

BACKGROUND

Known printers often utilize a mechanically driven carriage to linearly propel, position and transport a print head to a desired position adjacent to a print medium. The print medium, in turn, is mechanically driven and positioned underneath and/or adjacent to the print head. During a print operation, the print head and the print medium are positioned relative to each other as an image is laid down.

Other known printers are designed and configured to be portable. For example, portable printers often include miniaturized components to reduce the overall weight and size of the device. Regardless of the size of these portable printers, the configuration and motion of the print head and the print medium operate in the same manner as the known printers discussed above. Thus, the print head and print medium drive mechanisms limit the size reduction of the printer as well as the material that may be used as the print medium.

SUMMARY

The present disclosure generally relates to hand-held printers and more particularly to hand propelled printers configured to dispense a printing substance on a variety of print mediums. It would be desirable to provide a printer having the ability to optimize and adapt a print job based on the color of the print medium upon which it is to be dispensed and/or deposited. It would further be desirable to provide a mobile printer configured to utilize the color of the print medium to enhance the print job. Alternatively, it would be desirable to replace the color of the print medium within the print job to facilitate easy identification and/or contrast within the image represented and recreated by the print job.

In one embodiment, a hand-held printer is disclosed. The hand-held printer includes an image sensor configured to determine a color having a plurality of color components associated with a print medium, an image processing module configured to process image data into a plurality of color layers; and a print module configured to receive information related to the plurality of color components from the image sensor and information related to the plurality of color layers from the image processing module. The print module being configured to enhance at least one of the plurality of color layers based on at least one of the corresponding plurality of color components associated with the print medium.

In another embodiment, a method for tuning an image utilizing a hand-held printer is disclosed. The method includes determining a color having a plurality of color components associated with a print medium, processing image data to define a plurality of color layers, and enhancing at least one of the plurality of color layers based on at least one of the corresponding plurality of color components associated with the print medium.

Additional features and advantages of the disclosed hand-held printer are described in, and will be apparent from, the following Detailed Description and the figures.

DETAILED DESCRIPTION

The embodiments and concepts discussed herein provide for a mobile or hand propelled printer having a compact size and suitable for printing on a wide variety of print mediums. The exemplary mobile or hand propelled printer eliminates the carriage and paper handling mechanisms and may include scanning and position sensors.

Figure 1:
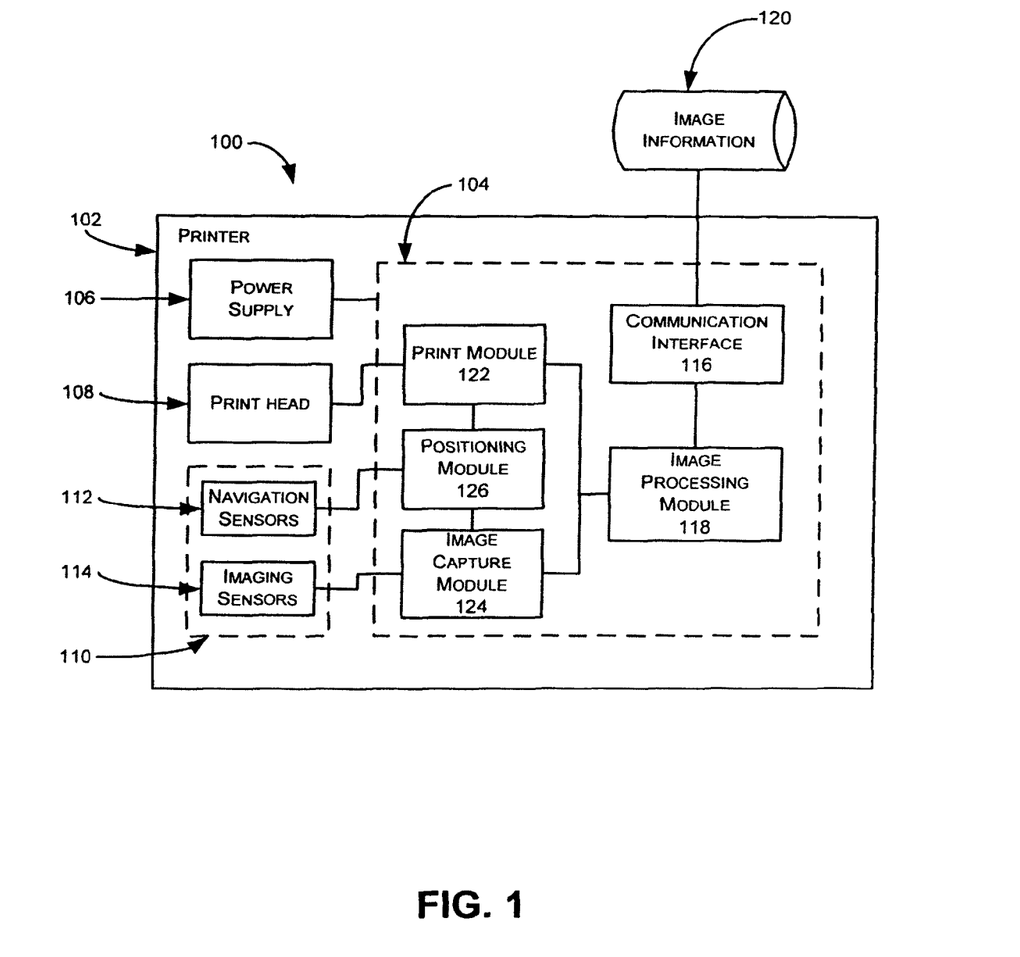
FIG. 1 is a logical schematic of a hand-held printer in accordance with the teachings disclosed herein.

FIG. 1 illustrates a schematic 100 depicting the physical and logical components of a mobile or hand propelled printer 102. As used herein, the terms printer, printing device, hand-held printer, mobile printer and hand propelled printer are intended to be synonymous and interchangeable. The printer 102 may include a controller 104 powered by a power supply 106 and in communication with a print head 108 and a sensor suite 110. The sensor suite 110, in this exemplary embodiment, may include one or more position or navigation sensors 112 and one or more optical imaging sensors 114. The controller 104 and the sensor suite 110 cooperate to facilitate precise and accurate positioning of the print head 108 throughout printing and/or scanning operations. Precise positioning allows the printer 102 to reliably produce or print images and scan or acquire images.

The controller 104 may include a communication interface or module 116 coupled to an image processing module 118 and an image information source 120. The image processing module 118 may, in turn, be communicatively coupled to a print module 122 and an image capture module 124. The print module 122 and image capture module 124 are, in this exemplary embodiment, communicatively coupled to a positioning module 126.

The image information source 120 may be any type of device capable of transmitting data related to an image, picture or file to be printed by the print head 108. The image information source 120 may include a general purpose computing device, e.g., a desktop computing device, a laptop computing device, a mobile computing device, a personal digital assistant, a cellular phone, etc. or it may be a removable storage device, e.g., a flash memory data storage device, designed to store data such as image data. If, for example, the image information source 120 is a removable storage device, e.g., a universal serial bus (USB) storage device, the communication interface 116 may include a port, e.g., a USB port, to engage and communicatively receive the storage device. In another embodiment, the communication interface 116 may include a wireless transceiver to allow for the wireless communication of image data between the image information source 120 and the controller 104. Alternatively, the communication interface 116 may facilitate creation of an infrared (IR) communication link, a radio-frequency (RF) communication link or any other known or contemplated communication system, method or medium.

The communication interface 116 may, in other alternate embodiments, be configured to communicate with the image information source 120 through one or more wired and/or wireless networks. The networks may include, but are not limited to, a personal area network (PAN), a local area network (LAN), a wireless local area network (WLAN), a wide area network (WAN), etc. The networks may be established in accordance with any number of standards and/or specifications such as, for example, IEEE 802.11x (where x indicates a, b, g and n, etc.), 802.16, 802.15.4, Bluetooth, Global System for Mobile Communications (GSM), code-division multiple access (CDMA), Ethernet, etc.

The image processing module 118 may receive the image data from the communication interface 116 and process the received image data to create a print job for use within the printing process. Alternatively, the processing of the image data may be performed by the image information source 120 or other device or module and the resulting print job may be communicated to the communication interface 116. The processed image data and/or print job may, in turn, be provided to the print module 122. The print module 122 can cache or store the processed image data or may communicate the data in real-time for printing by the print head 108.

The positioning module 126 may provide position information to the print module 122. The position information may be utilized to calculate the relative position of the print head 108 to a reference point defined or established on the print medium or within the image data being printed and/or scanned. The position information may be generated or calculated by the positioning module 126 based on signals, measurements or other information received from the one or more navigation sensors 112. The navigation sensors 112 may, for example, be an optoelectronic sensor, an electromechanical sensor or one or more inertial sensors configured to provide location and direction information to the printer 102 and the print head 108. The location and directional information may, in turn, be utilized by the positioning module 126 to determine the precise location of the printer 102 and print head 108 relative to the surface of the print medium upon which the image data is to be reproduced. Print medium, as discussed herein, may be any type of material or medium on which a printing substance, e.g., ink, powder, etc., may be deposited.

The position information provided by the navigation sensors 112 may be utilized by the print module 122, via the positioning module 126, to coordinate the location of the print head 108 to a position within the processed image data provided by the image processing module 118. The print module 122 may then direct and control the print head 108 to dispense and deposit ink on the print medium to represent the corresponding portion of the processed image data.

The print head 108 may be an inkjet print head having a plurality of nozzles or primitives (see FIGS. 2A and 2B for details) configured to dispense a printing substance, e.g., liquid ink droplets, on a print medium. The printing substance may be contained in reservoirs or cartridges. The reservoirs or cartridges may contain or store black ink, and/or multiple colors such as cyan ink, magenta ink, yellow ink, and black ink. Other embodiments may utilize other printing techniques, e.g., toner-based printers such as laser or light-emitting diode (LED) printers, solid ink printers, dye-sublimation printers, inkless printers, etc.

The image capture module 124 may receive image information from the one or more optical imaging sensors 114. The optical imaging sensors 114 may be charge coupled devices (CCDs) configured and arranged to capture a plurality of images and/or indicators representative of the surface of the print medium or other scannable medium. The plurality of images may be processed by the image capture module 124 and reassembled to generate a representation of the print medium or scannable medium. For example, the optical image sensors 114 may capture, among other things, color data or other indications characteristic or representative of the print medium. The image capture module 124 may, in turn, receive positioning information from the positioning module 126 to facilitate the arrangement and reassembly of the plurality of captured images provided by the optical image sensors 114. In this manner, the printer 102 may be utilized to scan, process, store and duplicate images via the cooperation of the image capture module 124, the positioning module 126 and the print module 122.

The image capture module 124 may, in another embodiment, be utilized to calibrate the positioning module 126. For example, an image captured by the optical image sensors 114 may be compared to the processed image data provided by the image processing module 118 to correct or compensate for accumulated positioning errors and/or to reorient the positioning module 126. For example, if the printer 102 is removed from the print medium during a printing procedure, the positioning module 126 may lose track of the reference point associated with the printing procedure.

Figure 2A:
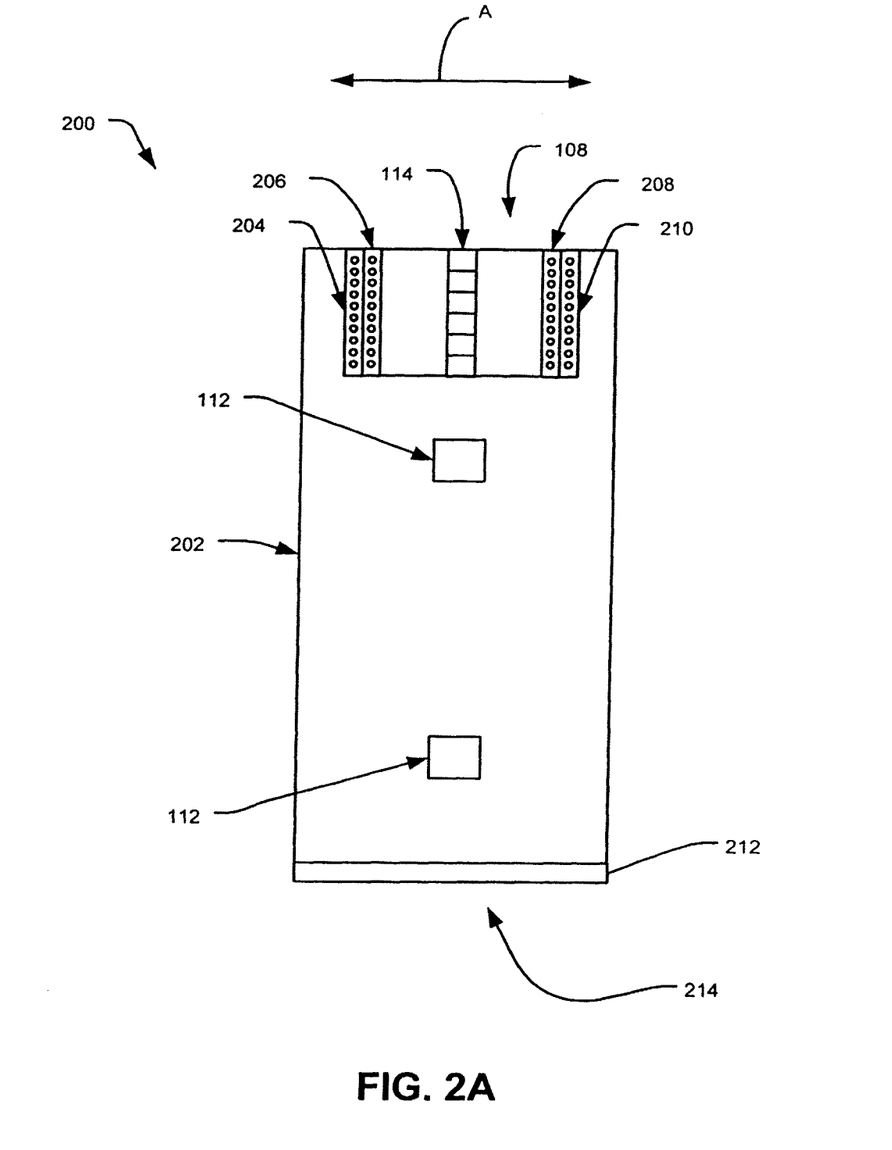
FIG. 2A is a bottom plan view of the hand-held printer discussed in conjunction with FIG. 1.

FIG. 2A illustrates a bottom plan view of a printing device 200 which may be constructed to include the teachings discussed in conjunction with the logical schematic 100 and the mobile or hand propelled printer 102. Thus, the components and elements of the printer 102 may be included in, or integral to, the printing device 200. For example, the printing device 200 includes a housing 202 that supports and carries the print head 108 and the sensor suite 110 (see FIG. 1) including a pair of navigation sensors 112 and one or more optical image sensors 114. The housing 202 may further include a cover or panel 212. The cover 212 may be hinged or pivotably attached to the housing 202. The cover 212 may protect an interior portion 214 including, for example, components and elements of the printer 102 positioned or accessible within the housing 202.

The pair of navigation sensors 112 may be used by the positioning module 126 (see FIG. 1) to determine positioning information related to the optical imaging sensors 114 and/or the print head 108. The housing 202 supports the optical imaging sensors 114 and the print head 108 fixed relative to the pair of navigation sensors 112 such that the image and/or position information obtained by the navigation sensors 112 may be precisely correlated to the relative to the optical imaging sensors 114 and the print head 108.

The print head 108, in this exemplary embodiment, may be an inkjet print head having a number of nozzle arrays for different colored inks. For example, if the print head 108 is a color (CMYK) print head, it may include a nozzle array 204 for cyan-colored ink (C), a nozzle array 206 for magenta-colored ink (M), a nozzle array 208 for yellow-colored ink (Y), and nozzle array 210 for black-colored ink (K). The nozzle arrays 204 to 210 of the print head 108 may be arranged adjacent to optical imaging sensors 114. This configuration allows the optical imaging sensors 114 to capture information about the ink deposited on the print medium by the print head 108 as it is dispensed. This information may be used for error correction and verification of the processed image data throughout the dispensing and/or printing processes.

The nozzle arrays 204 to 210 in this exemplary embodiment are arranged according to color. For example, the arrangement and order of the colors stored within the nozzle arrays 204 to 210 may be based on predetermined deposition orders and/or amounts necessary to create new colors by depositing and thereby mixing the colors stored within the nozzle arrays 204 to 210. Utilization of different base or constituent colors, e.g., colors other than CMYK, may require a different nozzle order or arrangement to produce the desired colors, color combinations, etc.

Figure 2B:
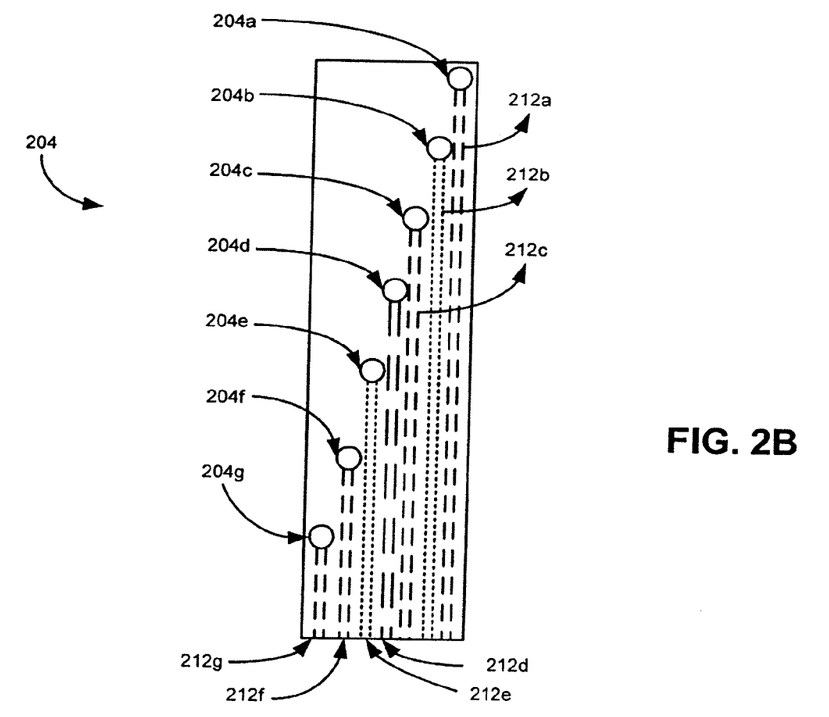
FIG. 2B is an enlarged plan view of a nozzle array shown in FIG. 2A.

FIG. 2B illustrates an enlarged plan view of the nozzle array 204. It will be understood that the nozzle array 204 is shown by way of example, and that the teaching and concepts discussed in connection with this exemplary nozzle array may be applied to other nozzle arrays and/or nozzle array configurations. The nozzle array 204 includes a plurality of individual nozzles identified by the reference numerals 204a to 204g. As illustrated in FIG. 2B, the nozzles 204a to 204g are staggered or offset along the length of the nozzle array 204. The stagger allows for the manufacture or formation of fluid passages 212a to 212g, which correspond to the nozzles 204a to 204g, respectively. The fluid passages 212a to 212g may be fluidly coupled to a reservoir (not shown) containing or storing the printing substance or ink to be dispensed through the nozzles 204a to 204g.

Figure 2C:
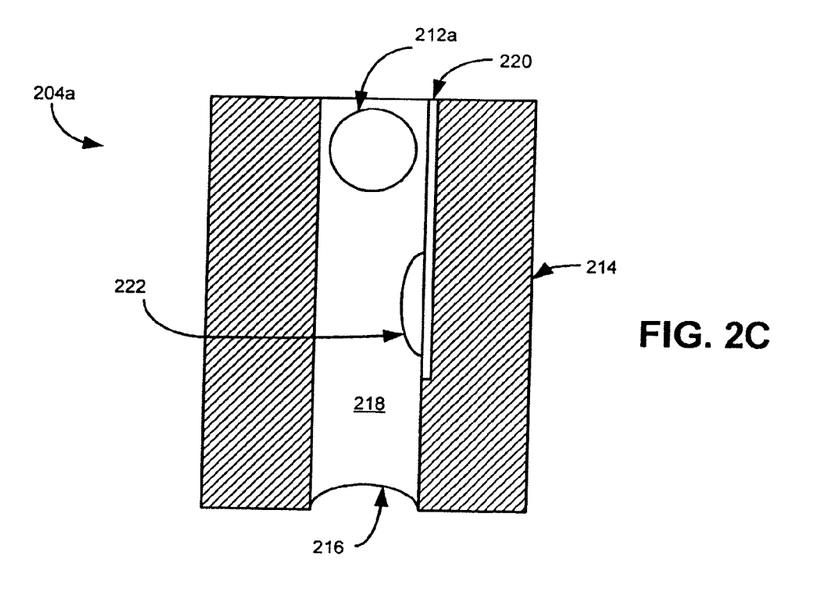
FIG. 2C is an enlarged cross-sectional view of a nozzle shown in FIGS. 2A and 2B.

FIG. 2C illustrates an enlarged cross-sectional view of the exemplary nozzle 204a. In particular, the nozzle 204a may be formed within a casing 214 such that the fluid passage 212a is fluidly coupled to a dispensing orifice 216. In operation, the printing substance may be provided to the nozzle 204a via the fluid passage 212a and a dispensing chamber 218. A dispensing chamber 218 may be provided for each of the nozzles 204a to 204g and individually identified as 218a to 218g, respectively. The printing substance or ink, once delivered to the dispensing chamber 218, may be retained via capillary action.

The nozzle 204a may further include a heating element 220 such as, for example, a resistor. In operation, the heating element 220 creates heat in response to an applied electric current. The heat, in turn, creates a bubble 222 by vaporizing the printing substance. As the bubble 222 expands, the printing substance within the dispensing chamber 218 may be forced through the dispensing orifice 216 and onto the surface of the print medium (not shown). When the bubble 222 collapses, a vacuum may be created. The resulting vacuum pulls or resupplies printing substance from the reservoir (not shown) into the dispensing chamber 218 via the fluid passage 212a. By activating and/or firing individual heating elements within each of the nozzles 204a to 204g which make up the printing array 204, the print head 108 and print module 122 may dispense printing substance on the print medium to create an image.

Figure 3:
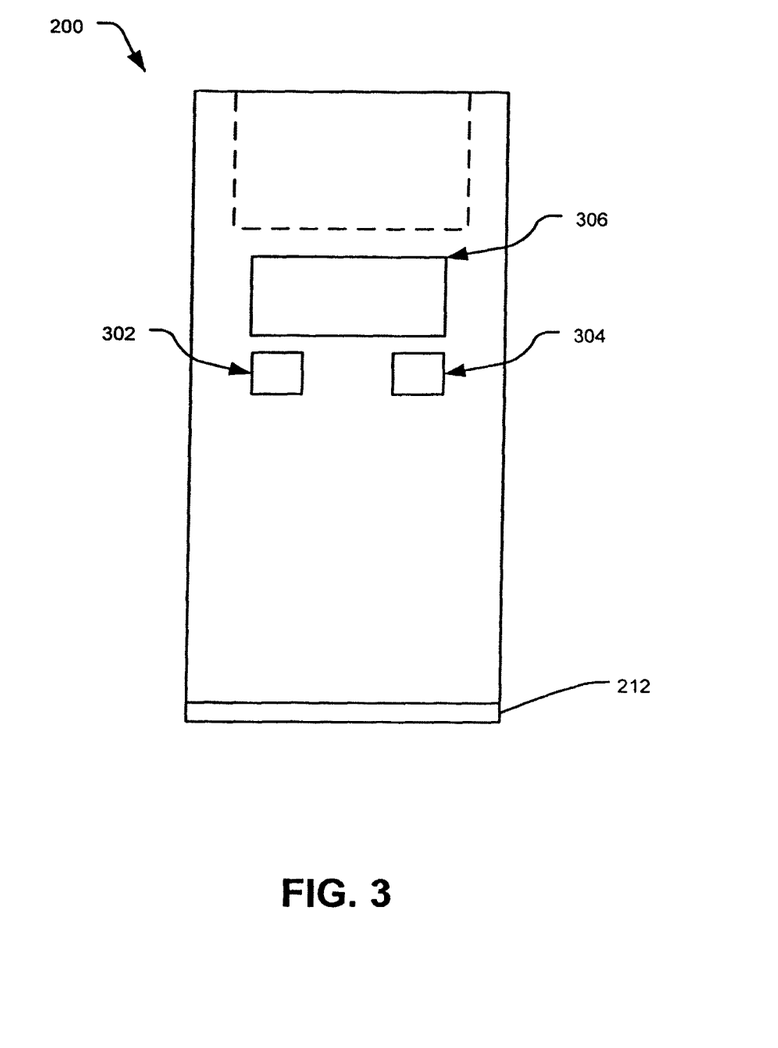
FIG. 3 is a top plan view of the hand-held printer shown in FIG. 2A.

FIG. 3 illustrates a top plan view of the printing device 200 shown in FIG. 2A. The printing device 200 may include a variety of user controls, buttons, touch screens, etc., based on the functionality designed into or supported by the controller 104 shown in FIG. 1. For example, the printing device 200 includes a print control input 302, a scan control input 304 and a display 306 communicatively coupled to the controller 104. The print control input 302 may provide a signal to the controller 104 that can be utilized to initiate/resume a print operation. The scan control input 304 may provide a signal to the controller 104 that can be utilized to initiate/resume a scan operation.

The display 306, which may be a passive display, an interactive display, etc., may provide the user with a variety of information. The information may relate to the current operating status of the printing device 200 (e.g., printing, ready to print, scanning, ready to scan, receiving print image, transmitting print image, transmitting scan image, etc.), power of the battery, errors (e.g., scanning/positioning/printing error, etc.), or instructions (e.g., "position device over a printed portion of the image for reorientation," etc.). If the display 306 is an interactive display it may provide a control interface in addition to, or as an alternative from, the control inputs 302 and 304.

Figure 4:
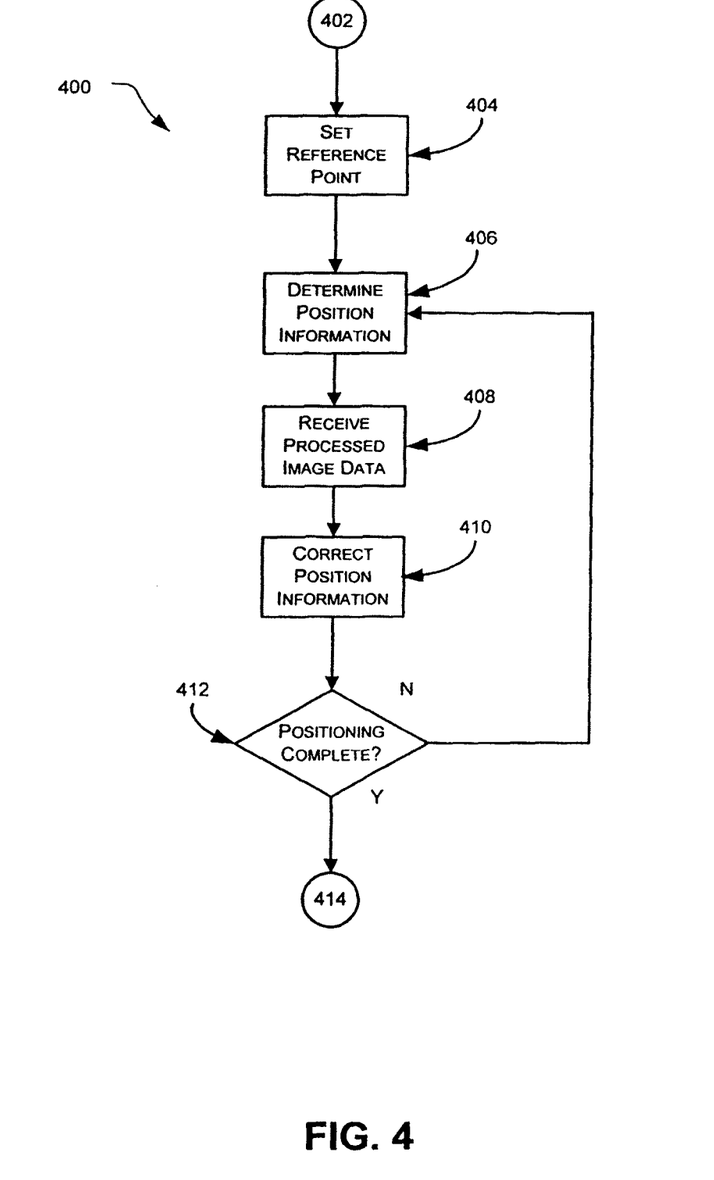
FIG. 4 is a flowchart describing an exemplary positioning operation that may be performed by the hand-held printer.

FIG. 4 depicts a flow diagram illustrating an exemplary positioning operation 400 that may be performed by the printing device 200 shown in FIG. 2. At block 402, the positioning operation 400 may begin with the initiation of a scanning or a printing operation. For example, the print control input 302 (see FIG. 3) may provide a signal to the controller 104 (see FIG. 1) to initiate a print operation, or the scan control input 304 (see FIG. 3) may provide a signal to the controller 104 to initiate a scan operation.

At block 404, a reference point on the printing medium may be established by the positioning module 126. For example, the user may be instructed via text or graphics provided by the display 306 to activate one of the inputs 302, 304 when the printing device 200 is positioned in a desired starting location. Alternatively, the user may preposition the printing device 200 in the desired starting location and orientation and the reference point may be established upon activation of the appropriate input 302, 304.

At block 406, the positioning module 126 may utilize information provided by the navigation sensors 112 to determine position information, e.g., translational and/or rotational changes relative to the reference point, for the printing device 200. The translational changes may be determined by tracking incremental changes of the positions of the navigation sensors along a two-dimensional coordinate system, e.g., $\Delta x$ and $\Delta y$. Rotational changes may be determined by tracking incremental changes in the angle of the printing device, e.g., $\Delta \theta$, with respect to, e.g., the y-axis. These transitional and/or rotational changes may be determined by the positioning module comparing consecutive navigational images taken by the navigation sensors 112 to detect these movements.

At block 408, the positioning module 126 may further receive the processed image data from the image processing module 118. If all or part of an image has been previously deposited or printed at a given location, the optical image sensors 114 may be utilized to verify the accuracy of the calculated position location with respect to the received processed image data. For example, the optical image sensors 114 may sample the deposited image (or image to be scanned) and compare that sample to a corresponding position within the received processed image data. This verification process may further note and compensate for images in which the printing and/or deposition is incomplete.

At block 410, the positioning module 126 may correct for differences and deviations between the calculated position location and the received processed image data. For example, with enough information, e.g., sufficient material deposited in the location scanned by the optical image sensors 114, the positioning module 126 may offset and align the position information to ensure that the two images match. If the positioning module 126 is unable to determine an appropriate offset based on the available information, the optical image sensors 114 may be utilized to gather more information, identify patterns, etc. The additional information and/or patterns may, in turn, be utilized by the positioning module 126 to determine the offset necessary to align the calculated position location and the received processed image data. Correction and compensation may be performed continually or periodically based on, for example, image complexity, available processing power, desired resolution, etc.

At block 412 the positioning operation 400 and positioning calculations may be evaluated. If the position information is determined to be accurate, then at block 414 the positioning operation 400 may be completed. If the position information is incomplete, inaccurate or otherwise unacceptable, then positioning operation 400 may return to block 406 and begin the process again.

Figure 5:
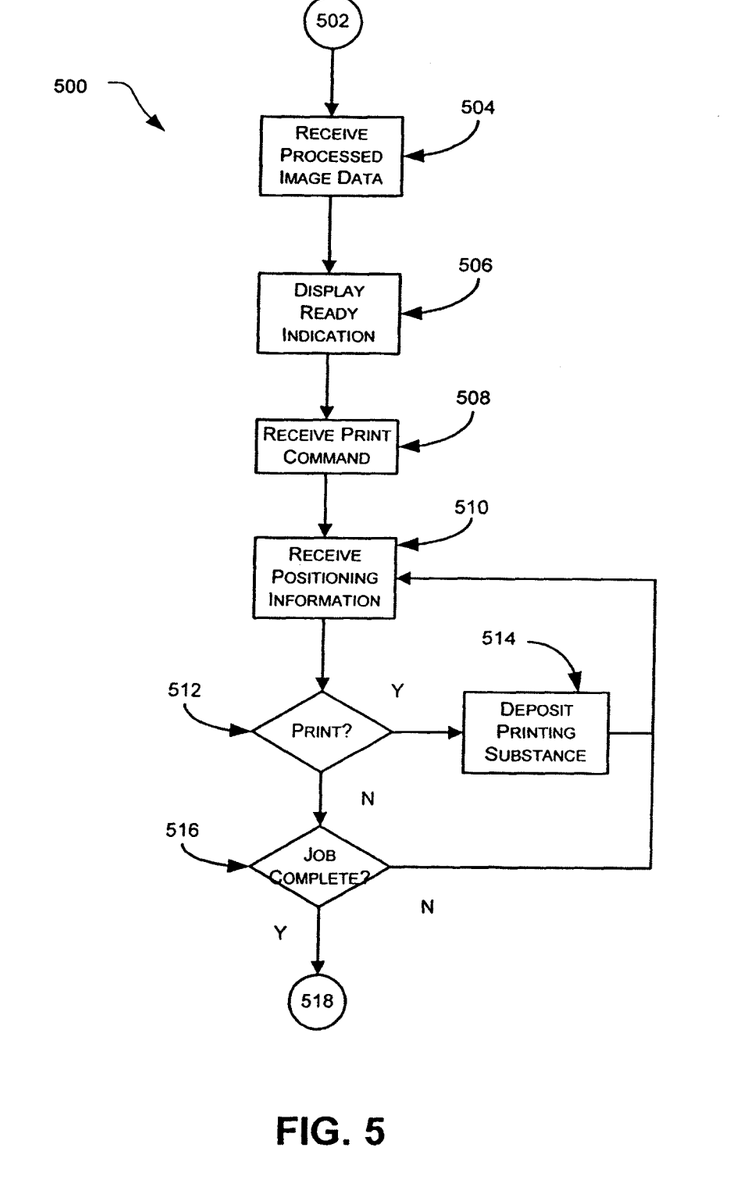
FIG. 5 is a flow diagram describing an exemplary printing operation that may be performed by the hand-held printer.

FIG. 5 depicts a flow diagram illustrating a printing operation 500 that may be performed by the printing device 200. At block 502, the printing operation 500 may begin or be initiated by, for example, a signal provided by the print control input 302.

At block 504, the print module 122 may receive processed image data from the image processing module 118. As previously discussed, the image data may be received in a raw or unprocessed format from the image information source 120 and processed for printing by the image processing module 118. Alternatively, the image data may be preprocessed by the image information source 120 and communicated to the print module 122 as discussed in connection with FIG. 1.

At block 506, the display 306 may indicate that the printing device 200 is ready to print the processed image data. The display 306 may also provide a thumbnail representation of the processed image data. The thumbnail image provided by the display 306 may be utilized to indicate the status of the printing operation 500. For example, thumbnail image may be erased, shaded or otherwise modified as the printing device 200 dispenses and prints the processed image data on a print medium.

At block 508, the print module 122 may receive a signal representative of a print command generated from a user activating the print control input 302 in block 516. At block 512, the print module 122 may then determine whether to deposit printing substance, e.g., one or more colors of ink, at the given location on the surface of the print medium. For example, the determination to print or deposit ink may be a function of the total drop volume to be placed at a given location on the surface of the print medium and the drop volume previously deposited at that location. If additional printing or deposition is to occur, then at block 514 the print module 122 may cause the print head 108 to dispense an appropriate amount of the printing substance as the printing device 200 is moved or propelled across the surface of the print medium by the user. The printing operation 500 may, in turn, return to the block 510 to receive additional positioning information in preparation for further deposition.

At block 510, the print module 122 may further receive positioning information from the positioning module 126.

If no additional printing or deposition is to occur, then at block 516, the printing operation 500 may determine if the print job has been completed. The determination of whether the print job is complete may be a function of the printed volume versus the total print volume. Alternatively, the determination to end the printing operation 500 may be reached even if the printed volume is less than the total print volume. For example, the end of the printing operation 500 may occur when the printed volume is ninety-five percent (95%) of the total print volume. If the print job is completed, then at block 518 the printing operation 500 ends. If the print job is not complete, then the printing operation 500 may return to the block 510 to receive additional positioning information in preparation for further deposition.

Figure 6A:
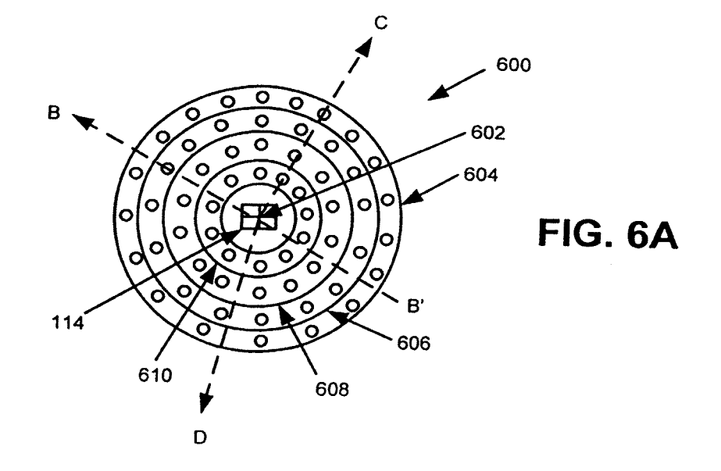
FIGS. 6A and 6B are enlarged views of exemplary nozzle arrays constructed in accordance with the teaching and disclosure provided herein.
Figure 6B:
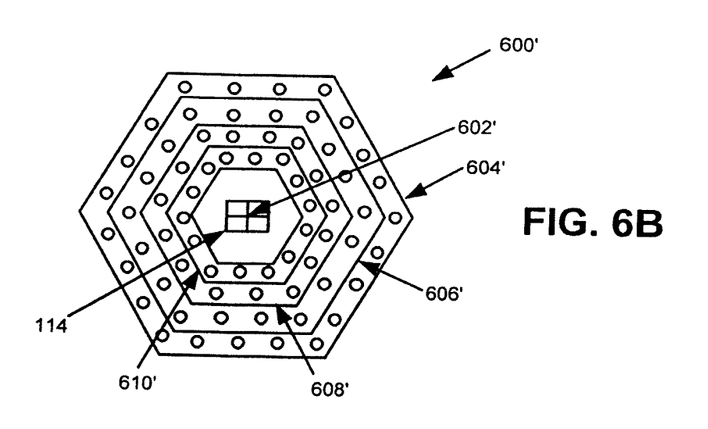

FIGS. 6A and 6B illustrate exemplary physical arrangements of the print head 108 including nozzle arrays configured to optimize hand-held printing. For example, during a typical printing operation, the user may propel or move the printing device 200 in a side to side motion as indicated by the arrow A (see FIG. 2A). The back and forth motion of the printing device 200, in turn, moves and positions the linear nozzle arrays 204 to 210 to desired positions over the surface of the print medium. Printing substances, and in particular CMYK inks, which may be dispensed by the printing device 200, as directed by the print module 122, are often calibrated, tested and otherwise arranged to create or provide colors based on their deposition order and/or amounts. For example, to create a given color could require that four (4) parts cyan, two (2) part yellow and six (6) parts magenta be deposited in a particular order and in the specified amounts. Maintaining or providing the correct deposition order may be difficult given the erratic motion of the printing device 200 and the physical arrangement of the nozzle arrays 204 to 210.

FIG. 6A illustrates one embodiment of an exemplary print head 108 that includes a concentric circular nozzle array 600 optimized for multidirectional printing. In particular, the concentric circular nozzle array 600 may include a nozzle array 604 for cyan-colored ink (C), a nozzle array 606 for magenta-colored ink (M), a nozzle array 608 for yellow-colored ink (Y), and nozzle array 610 for black-colored ink (K). In this exemplary embodiment, each of the circular nozzle arrays 604 to 610 may be concentric around or equidistant to a reference point 602. Moreover, the reference point 602 may further be the location of the optical image sensors 114.

In this exemplary embodiment, the configuration and relative position of the circular nozzles 604 to 610 allows for multi-color dispensing and printing in variety or multitude of vectors or directions. For example, instead of dispensing and printing when the printing device 200 is propelled by the user in a side-to-side manner (see arrow A in FIG. 2A), the user may move the printing device 200 in any direction or vector along the surface of the print medium and dispense printing substances. The vector arrows B, C and D indicate three (3) distinct directions in which the printing device 200 may be propelled by the user. It will be understood that given the circular arrangement of the concentric circular nozzle array 600 any number of directions or vectors may be utilized. Regardless of the specific vector arrow B, C and D followed by the printing device 200, it will be noted that the relative position and alignment of the circular nozzle arrays 604 to 610 remain fixed and constant with respect to each other and the reference point 602. Moreover, as shown by the extended vector B, the leading edge portion (near the label B) and trailing edge portion (near the label B') of the circular arrangement of the nozzle array 600 effectively provides for two, albeit mirror images of each other, separate arrays which may be utilized to dispense printing substances. The print module 122 may be utilized to control, time and otherwise direct the dispensing of printing substances from, for example, the circular nozzle array 606 disposed substantially adjacent to the leading edge portion (near the label B) and the circular nozzle array 606 disposed substantially adjacent to the trailing edge portion (near the label B') as the printing device 200 is moved along the printing surface.

FIG. 6B illustrates another embodiment of an exemplary print head 108 that includes a polygon nozzle array 600' optimized for multidirectional printing. In particular, the polygon nozzle array 600' may include a nozzle array 604' for cyan-colored ink (C), a nozzle array 606' for magenta-colored ink (M), a nozzle array 608' for yellow-colored ink (Y), and nozzle array 610' for black-colored ink (K). In this exemplary embodiment, the polygon nozzle array 606' may be substantially concentric around or substantially equidistant to a reference point 602'. Moreover, the reference point 602' may further be the location of the optical image sensors 114.

Figure 7:
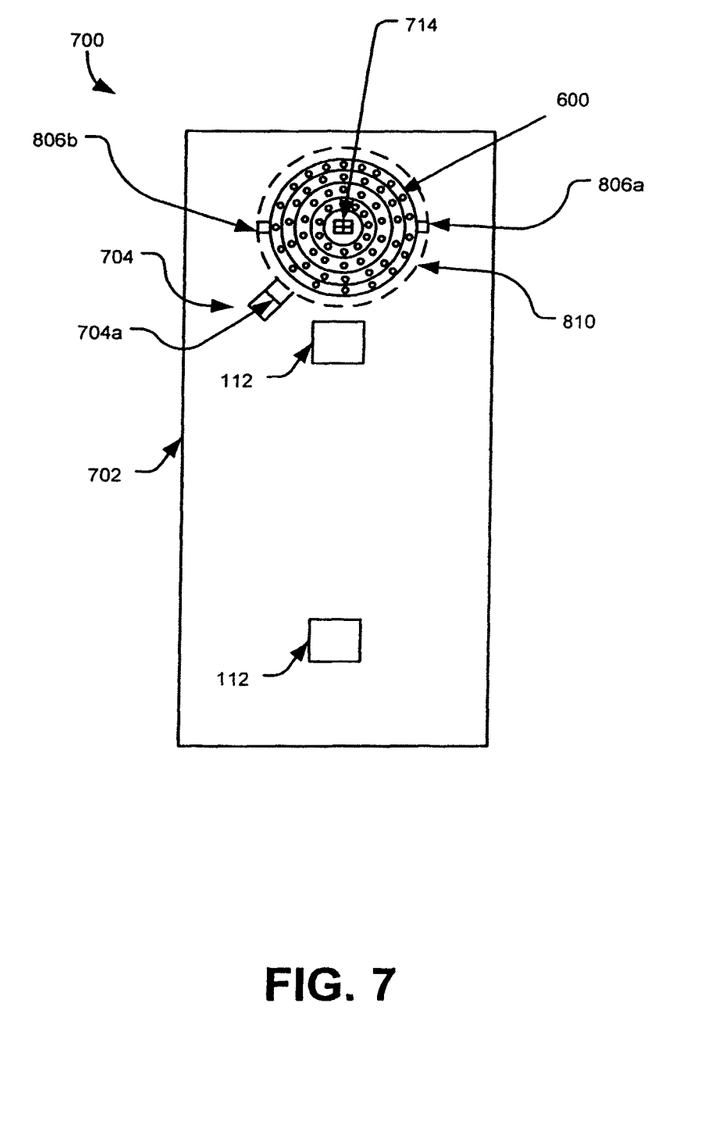
FIG. 7 is a bottom plan view of the hand-held printer including the exemplary nozzle array shown in FIG. 6A.

FIG. 7 illustrates an alternate bottom plan view of a printing device 700 which may be constructed to include the teachings discussed in conjunction with the logical schematic 100 and the mobile or hand propelled printer 102. In particular, the printing device 700 may include the concentric circular nozzle array 600 and an imaging array 714 (see the imaging array 114 in FIG. 6A) mounted in the printer housing 702. In particular, the imaging array 714 may be mounted or positioned within the center or central portion of the circular nozzle array 600. The imaging array 714 may be, for example, a line scanner, optical sensors such as a charge coupled device (CCD) or any other imaging or scanning device.

The housing 702 further includes a locking mechanism 704 disposed substantially adjacent to the concentric circular nozzle array 600. The locking mechanism 704 may be a spring loaded latch configured to releasably cooperate with a protective cap or cap (not shown). Alternatively, the locking mechanism 704 may be a friction lock that utilizes a slip or interference fit with the housing 702 to engage and secure the cap (not shown).

Figure 8:
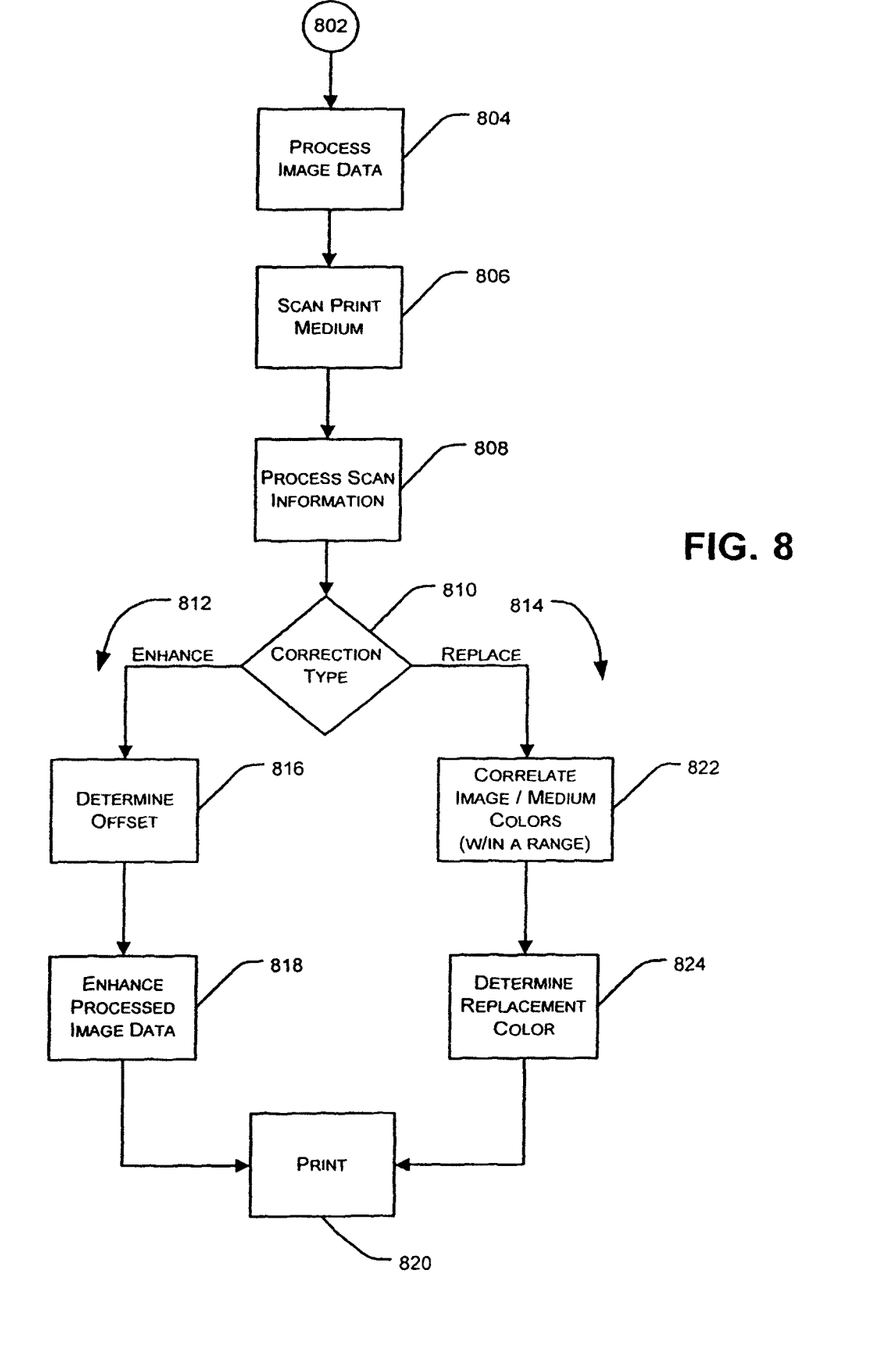
FIG. 8 is a flowchart describing an exemplary printing operation that may be performed by the hand-held printer.

FIG. 8 illustrates one embodiment of an exemplary printing method 800 that may be implemented by the printing device 200, 700. In this exemplary embodiment, the printing device 200, 700 may be configured to tune or alter the manner in which printing substances are dispensed based on the characteristics, color, etc. of the print medium. For example, the color of the print medium may be utilized to enhance or augment the color of an image to be printed. For example, if the print medium is a CMYK color that appears or is utilized in a CMYK image, the characteristics of the CMYK image may be altered to utilize the CMYK color of the print medium. In this way, the CMYK color of the print medium may be utilized in place of the corresponding color within the image, allowing the printing device 200, 700 to conserve printing substances.

At block 802, exemplary printing process 800 begins with the printing device 200, 700 receiving image data or information from the image information source 120 at the controller 104.

Figure 9A:
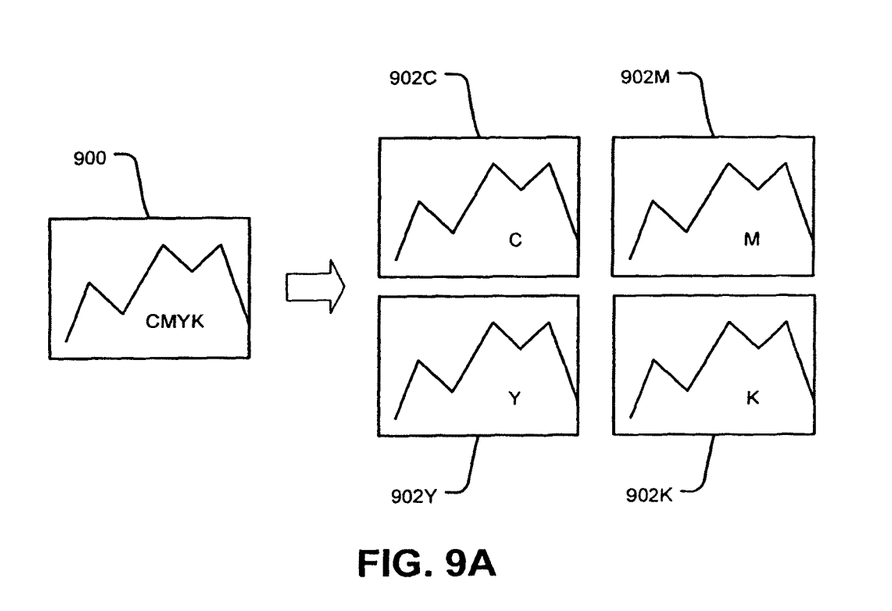
FIGS. 9A and 9B illustrate color layers that may be utilized in conjunction with the printing operation shown in FIG. 9.

At block 804, the received image data may be processed or evaluated by the image processing module 118 as shown in FIG. 9A. For example, the image data may represent a four-color CMYK image 900. The image processing module 118 may process, separate or deconstruct the image 900 into individual color layers 902C, 902M, 902Y and 902K. It will be understood that the color layers may be RGB layers, black and white layers, hue-saturation-brightness layers or any other known descriptive color scheme. The individual color layers 902C, 902M, 902Y and 902K, in turn, may be further processed, adjusted and/or combined to recreate the image 900.

At block 806, the imaging sensors 114 may collect information regarding the color characteristics of the print medium. For example, the imaging sensors 114 may be utilized to determine the texture, color and porosity of the print medium. The detected color of the printing medium may be broken down into individual color components corresponding to, for example, the RGB or CMKY color schemes as discussed above. The imaging sensors 114 may collect a single image to determine the color characteristics of the print medium, or multiple images to determine an aggregate or average color for the print medium.

At block 808, image or images collected by the imaging sensors 114 may be processed by, for example, the image processing module 118 or print module 122, to determine or quantify the individual color characteristics or components detected. Thus, the collected image or images may be broken down into individual color components such as, for example, $\Delta C$, $\Delta M$, $\Delta Y$, $\Delta K$, in preparation of further processing.

At block 810, a correction type or scheme to be implemented by the printing process 800 may be determined. Exemplary corrections that may be implemented include image enhancement 812 and color replacement 814. Image enhancement 812 may include utilizing the color and color components of the print medium to supplement the color(s) of the image data to be recreated by the printing device 200, 700. Color replacement 814 may include identifying a color of interest within the image data and selectively or globally replacing it with a different color to facilitate visual perception.

At block 816, the image enhancement 812 correction type is selected and an image offset may be determined. In particular, each of the individual color layers 902C, 902M, 902Y and 902K may be offset by the corresponding color components $\Delta C$, $\Delta M$, $\Delta Y$, $\Delta K$ to compensate, adjust and/or make-use of the color of the print medium. For example, if the print medium is yellow colored, the color layer 902Y may be ignored and the remaining color layers 902C, 902M and 902K may cooperate with the yellow print medium to recreate the image 900.

Figure 9B:
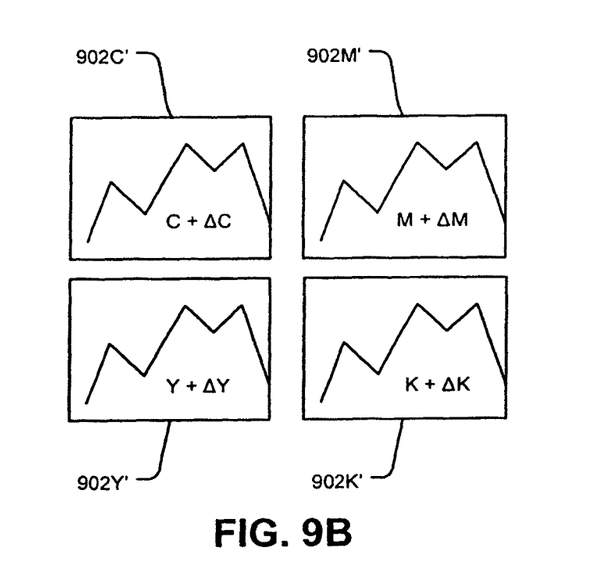

At block 818, the image processing module 114 and/or the print module 122 may utilize the color components $\Delta C$, $\Delta M$, $\Delta Y$, $\Delta K$ in conjunction with the color layers 902C, 902M, 902Y and 902K to define corrected color layers 902C', 902M', 902Y' and 902K'.

At block 820, the print head 108, the print module 122 and/or the image processing module 118 may cooperate to control and dispense the printing substance to recreate the corrected color layers 902C', 902M', 902Y' and 902K' on the print medium.

At block 822, the color replacement 814 correction type is selected and an image offset may be determined. In particular, the colors or patterns within the image 900 or each of the individual color layers 902C, 902M, 902Y and 902K may be evaluated to identify a color or pattern or interest. Alternatively, the printing device 200, 700 may prompt a user to identify the color, feature or pattern within the image 900. A range, for example, a ten percent (10%) variance, may be established to control the identification of the color. Thus, the color match or correlation between the color of the print medium and the color within the image 900 (or combination of the individual color layers 902C, 902M, 902Y and 902K) may be controlled or adjusted by varying the range.

At block 824, the identified or correlated color may be replaced by another, possibly more visually perceptible, color. For example, a color created by the magenta and yellow color layers 902M, 902Y may be replaced by a cyan (C) color. The replacement may require adjustments to the color layers 902M, 902Y, 902C. The replacement color may be pre-defined in a table or matrix and stored within the controller 104, or may be defined or selected by the user.

At block 820, as previously discussed, the print head 108, the print module 122 and/or the image processing module 118 may cooperate to control and dispense the printing substance to recreate the corrected color layers 902C', 902M', 902Y' and 902K' on the print medium.

It will be understood that the color neutral printing substance or white ink may be dispensed initially by the printing device 200, 700 to prepare the print medium. For example, if the imaging sensors 114 detect any color (i.e., any non-neutral colors), the printing devices 200, 700 may be configured to dispense a base layer of white ink or neutral printing substances. The base allows the printing device 200, 700 to utilize the uncorrected print job to guide or control the print head 108 and/or print module 122.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

What is claimed is:

1. A hand-held printer comprising:
   an image sensor configured to sense a background color of a print medium, and generate background color data corresponding to the sensed background color of the print medium; and
   a controller configured to:
      receive the background color data;
      receive image data corresponding to an image to be printed;
      process image color data corresponding to the image data,
      compare the background color data with the image color data;
      determine whether at least some of the background color data corresponding to the print medium and the image color data corresponding to the image data correlate to each other, and
      modify the image data by modifying at least one of a plurality of color layers that comprise the image data when at least some of the background color data corresponding to the print medium is determined to correlate with the image color data corresponding to the image data.

2. The hand-held printer of claim 1, wherein at least one of the background color and the image color data is represented as a red-green-blue (RGB) color or a cyan-magenta-yellow-black (CMYK) color.

3. The hand-held printer of claim 1, wherein the controller is configured to modify the image data by utilizing color components associated with the background color of the print medium in place of a similar color within the processed image color data of the image data.

4. The hand-held printer of claim 1, wherein the background color of the print medium is a characteristic of the print medium before printing.

5. The hand-held printer of claim 1, wherein the controller is configured to determine that at least some of the background color data corresponding to the print medium correlates to the image color data corresponding to the image data by determining at least one color component of the print medium corresponds to at least one color layer of the image data, and
   wherein the controller is configured to modify the image data by modifying the at least one color layer of the image data that corresponds to the at least one color component of the print medium.

6. The hand-held printer of claim 5, wherein the controller is configured to modify the image data in order to reduce an amount of printing substance dispensed onto the print medium during a printing by reducing an amount of printing substance that is dispensed corresponding to the at least one of the plurality of color layers that is modified.

7. The hand-held printer of claim 5, wherein the controller is configured to modify the at least one of the plurality of color layers by replacing the at least one of the plurality of color layers with an adjusted color layer.

8. The hand-held printer of claim 7, wherein the adjusted color layer is selected based on a predetermined range of variance with the replaced at least one of the plurality of color layers.

9. The hand-held printer of claim 1, wherein the controller is configured to modify the image data according to an image enhancement mode by:
   determining an offset between at least one of a plurality of color components that comprise the background color data and at least one of the plurality of color layers that comprise the image data; and
   correcting the image data by adjusting at least one of the plurality of color layers by an amount based on the determined offset.

10. The hand-held printer of claim 1, wherein the controller is configured to modify the image data according to a color replacement mode by:
    identifying a color within the plurality of color layers that comprise the image data;
    selecting a replacement color, and
    replacing the identified color within the plurality of color layers that comprise the image data with the selected replacement color.

11. A method for tuning an image utilizing a hand-held printer, the method comprising:
    determining, using a controller, a background color of a print medium, and generate background color data corresponding to the determined background color of the print medium;
    receiving the background color data;
    receiving image data corresponding to an image to be printed;
    processing, using the controller, image color data corresponding to the image data;
    comparing the background color data with the image color data;
    determining whether at least some of the background color data corresponding to the print medium and the image color data corresponding to the image data correlate to each other, and
    modifying, using the controller, the image data by modifying at least one of a plurality of color layers that comprise the image data when at least some of the background color data corresponding to the print medium is determined to correlate with the image color data corresponding to the image data.

12. The method of claim 11 further comprising dispensing a printing substance on the print medium in accordance with the modified image data.

13. The method of claim 11, wherein at least one of the background color and the image color data is determined as a function of a red-green-blue (RGB) color scheme or a cyan-magenta-yellow-black (CMYK) color scheme.

14. The method of claim 11, wherein the background color of the print medium is a characteristic of the print medium before printing the enhanced image data on the print medium.

15. The method of claim 11, wherein determining whether at least some of the background color data corresponding to the print medium correlates to the image color data corresponding to the image data comprises determining at least one color component of the print medium corresponds to at least one color layer of the image data, and
    wherein modifying the image data comprises modifying the at least one color layer of the image data that corresponds to the at least one color component of the print medium.

16. The method of claim 15, wherein the image data is modified in order to reduce an amount of printing substance dispensed onto the print medium during a printing by reducing an amount of printing substance that is dispense corresponding to the at least one of the plurality of color layers that is modified.

17. The method of claim 16, wherein the at least one of the plurality of color layers is modified in order to ignore the at least one of the plurality of color layers during dispensing of a printing substance.

18. The method of claim 15, wherein the at least one of the plurality of color layers is modified by replacing the at least one of the plurality of color layers with an adjusted color layer.

19. The method of claim 18, wherein the adjusted color layer is selected based on a predetermined range of variance with the replaced at least one of the plurality of color layers.

* * * * *